3,116,222
PROCESS FOR PREPARING TOYOCAMYCIN
Koppaka V. Rao, Pine Brook, William S. Marsh, Wanaque, and Donald W. Renn, River Vale, N.J., assignors to Chas. Pfizer & Co., Inc., New York, N.Y., a corporation of Delaware
No Drawing. Filed Oct. 5, 1962, Ser. No. 228,745
7 Claims. (Cl. 195—80)

This invention relates to the cultivation under control conditions of a strain of *Streptomyces rimosus*, to the biologically active substance produced thereby, the antibiotic toyocamycin, and to the methods for its recovery and concentration from crude solutions including fermentation broths.

This invention relates specifically to the preparation and isolation of toyocamycin from *Streptomyces rimosus*. Toyocamycin possesses known antimicrobial activity for a variety of organisms which was described by Nishimura et al. in J. Antibiotics, Ser. A9 (2), 60–62 (1956). In addition to this utility, toyocamycin is also known to be effective in inhibiting the growth of malignant tumors.

The organism which is employed in the valuable process of the present invention was isolated from a soil sample on an agar formulation of the following composition:

|  | G./l. |
|---|---|
| Dextrose | 2.0 |
| Asparagine | 0.2 |
| Beef extract | 0.25 |
| Dipotassium acid phosphate | 0.5 |
| Agar | 15 |

The isolated culture was examined and found to be a typical Streptomyces and was identified by Dr. J. B. Routien as a member of the species *Streptomyces rimosus*. This culture was "keyed out" using the key provided by Waksman in his book, The Actinomycetes, vol. 2, 1961. A culture of this strain has been deposited with the American Type Culture Collection of Washington, D.C., and given the ATCC No. 14500.

The culture characteristics of the culture are set forth in Table I. The results are based upon six tubes or plates of each medium incubated for two weeks.

ganism, regardless of its appearance or physiological behavior, that may be developed by means of transformation, transduction, genetic recombination or some other genetical procedure or equivalent material, whereby it has acquired the ability to produce the elaboration product here described or to carry on the biochemical change here described. For the preparation of toyocamycin, a wide variety of fermentation media are satisfactory. A medium composed basically of a source of nitrogen, a carbohydrate and minerals is required. Satisfactory nitrogen sources include hydrolyzed casein of various types, soy bean meal, distiller's solubles, corn meal, nitrates, ammonium salts, urea and the like. Suitable carbohydrate sources are corn starch, dextrose, lactose, dextrin, etc. The preceding materials frequently contain sufficient minerals to satisfy the mineral requirement of the organism without substantial addition of mineral components. A suitable aqueous nutrient medium contains 10 g./l. dextrose monohydrate, 15 g./l. dibasic potassium phosphate, 2 g./l. sodium chloride, 2.5 g./l. distillers' solubles and 2 g./l. of calcium carbonate. The pH of the fermentation is most suitably maintained between 6.5 and 7.5. After autoclaving and inoculating, the fermentation is carried out at a temperature usually between 26° and about 36° C. with aeration. The progress of fermentation is followed by testing the cytotoxic activity of the samples by the Toplin method, as described in Cancer Research, 19, 959 (1959), or by the Eagle-Foley growth method as described in Cancer Research, 18, 1017 (1958).

For the commercial production of antibiotic by this process, submerged culture in the usual type of equipment similar to those in the art is employed. Suitable tanks varying in size from 2000 gallons to 20,000 gallons or more, equipped with efficient agitation and means for aseptic aeration of the contents with up to two or more volumes of air per minute are employed. A satisfactory medium for large scale production is given above. The growth of the microorganism and antibiotic production usually reaches its maximum after about 60 to 72 hours at about 26° to about 36° C. However, variation in equipment used, the rate of aeration, stirring, etc. frequently affect the time period for maximum activity to be reached. A period of at least 24 hours is required in any case. Aeration of the medium on sub-

TABLE I

| Medium | Growth | Aerial Mycelium and Sporulation | Soluble Pigment | Remarks |
|---|---|---|---|---|
| Glucose-asparagine agar | Good | Lacking | Lacking | Vegetative mycelium pale yellow to cream-yellow. |
| Synthetic agar | Good, flat | Scant, too little to show color. | do | Vegetative mycelium colorless. Chains of spores in loose spirals and sometimes wavy. |
| Nutrient agar | Good | Lacking | do | Vegetative mycelium cream-yellow. |
| Glucose agar | do | Poor; white | do | Vegetative mycelium cream-yellow; very rimose. |
| Pridham's yeast extract agar | do | Moderate; white | do | Vegetative mycelium yellow; very rimose. |
| Gelatin | do | Lacking | do | Slight liquefaction. |
| Skimmed Milk | do | Moderate; whitish | do | Coagulation and peptonization. pH changed from 6.4 to 7.0. |
| Potato Plug | do | Good; whitish gray | do | Vegetative mycelium yellow-brown to yellow; rimose. |
| Starch Plate | Fair | Good; white | do | No hydrolysis. |
| Cellulose | No growth | | | |
| Dextrose-Nitrate Broth | | | | Nitrates reduced to nitrites. |
| Organic Nitrate Broth | | | | Do. |
| Calcium Malate | Fair | Lacking | Lacking | Vegetative mycelium yellow. Slight digestion of calcium malate. |
| Peptone Iron Agar | | | | No H$_2$S produced. |

It is to be understood that for the production of the antibiotic toyocamycin, according to the present invention, it is also intended to include mutants produced from this organism by various means such as radiation with X-ray, ultra-violet light, treatment with nitrogen mustards and the like. We wish also to include any organism, merged growth is maintained at the rate of about ½ to 2 volumes of air per volume of broth per minute. Aseptic conditions, of course, must be maintained throughout the transfer of the inoculum and the growth of the microorganism.

After a satisfactory level of the antibiotic is attained, the active substance may be isolated by procedures well known to those skilled in the art. For example, the antibiotic activity may be extracted from the filtrate broth at a pH from about 4 to about 6 with an alkanol. The solvent extract may then be concentrated to remove most of the alkanol. This concentrate is freeze dried and the solid extracted with an alkanol. The extract is passed through a chromatographic column for example a chromatographic column containing a weakly basic anion exchange resin. Thereafter, the column is washed with an alkanol. In this manner, the active substance goes through the column while most of the dark colored impurities remain absorbed thereon. The effluent fractions containing the active material are then combined and concentrated to a small volume causing the bulk of the active antibiotic to precipitate as a solid crystalline product. The active component toyocamycin may be further purified by recrystallization, for example, from a 1:1 mixture of methanol and chloroform.

Another method which may be employed to isolate the active substance is to stir the filtered broth from about 0.5 to about one hour with about 2% of activated carbon. The activated carbon is removed by filtration and the cake is washed and eluated twice with a mixture containing three parts of an alkanol and two parts of an equal mixture of water and pyridine. Thereafter, the combined eluate is concentrated to remove most of the organic solvents and is passed through a chromatographic column. Florisil an activated magnesium silicate which is prepared according to the procedure described in U.S. Patent 2,393,625 has been found to be of particular value when used as the chromatographic material. The column is then washed with water and the active material is eluted with an alkanol. The combined eluate is concentrated causing the crystallization of the active component. Toyocamycin may be further purified by recrystallization by the procedure described above. The term alkanol as employed in the aforementioned procedures consists of those alcohols containing from one to six carbon atoms.

The antibiotic of this process is obtained as a colorless crystalline solid which has a melting point of 247°–250° C. The elemental analysis is: 49.14% carbon, 4.47% hydrogen and 24.00% nitrogen, and it demonstrates a characteristic ultraviolet spectral with maxima at 232 and 278 mμ with $$E_{1\,cm.}^{1\%}$$

values of 355 and 535 respectively. The infrared spectrum was measured in a potassium bromide pellet containing 1.0% of the antibiotic; the most characteristic band in the infrared spectrum is at 4.5μ. This antibiotic is sparingly soluble in water, methanol, ethanol, isopropyl alcohol, butanol, acteone and ethyl acetate. It is soluble in dilute acids and alkali and gives a negative ferric chloride and a faintly positive ninhydrin reaction.

The chemical and physical properties described above agree with those given for toyocamycin, as described in the Journal of Antibiotics at 8A, 145 (1955) and 8A, 189 (1955).

Toyocamycin produced by the process of this invention was tested and found to be effective in treating a number of different types of malignancies. It was tested for anti-leukemia activity against a transplantable lymphoid leukemias, known as L–1210, in Swiss white mice weighing from 18 to 22 grams, according to the procedure described by Law, L. W., in the Journal of Natl. Cancer Inst., vol. 10, page 179 (1949). L–1210 was injected intraperitoneally with ascitic fluid diluted (after a cell count) to a concentration of $10^7$ cells/ml. Each animal received 0.1 ml. of diluted fluid ($10^6$ cells) and the animals were divided into groups of six. Intraperitoneal adminstration of toyocamycin, dissolved in 0.85% aqueous saline, in various doses at various times was began 24 hours after the injection of the L–1210. One group of animals which had been injected with L–1210 was maintained as a control and received injections containing only 0.85% saline. The study was continued until all the animals died. During this time, the change in body weight was recorded and, thereafter, a comparison of the survival time was made of the animals treated with toyocamycin and the untreated animals.

The activity of toyocamycin is particularly pronounced against human carcinoma cells (strain HeLa) grown in a tissue culture according to the procedure described by Rightsel et al. (Journal of Immunology, vol. 76, pages 464–474, 1956). In this test, the cytotoxic activity of toyocamycin is detected at levels as low as 0.018 mcg./ml. This compares well with other highly cytotoxic compounds such as actinomycin D at 0.10 mcg./ml., nitrogen mustard at 8.0 mcg./ml. and 5-fluoro uracil at 100 mcg./ml.

The following examples are given by way of illustration and are not intended to depart from the spirit and scope of the appended claims.

*Example I*

A nutrient medium having the following composition is prepared and sterilized:

| | Grams |
|---|---|
| Glucose | 10 |
| Soy bean meal | 15 |
| Distillers' solubles | 2.5 |
| Sodium chloride | 2.0 |
| Potassium phosphate dibasic | 2.5 |
| Calcium carbonate | 2.0 |
| Water to make 1.0 liter. | |

The medium is inoculated with ATCC 14500 culture and incubated at 28° C. for 65 hours with agitation and aeration. The broth is then filtered.

*Example II*

The experiment of Example I is repeated, substituting a medium of the following composition:

| | Grams |
|---|---|
| Cerelose [1] | 10 |
| Corn starch | 10 |
| N-Z-Amine B [2] | 5 |
| Curbay [3] | 5 |
| Sodium chloride | 5 |
| Soy bean meal | 15 |
| Calcium carbonate | 1 |
| Water to make 1 liter. | |

[1] A commercially available glucose.
[2] A commercially available casein hydrolysate.
[3] A commercially available concentrated blackstrap molasses stillage from an ethyl alcohol fermentation.

Fermentation is permitted to continue at 30° C. for 72 hours with aeration and agitation. The broth is then filtered.

*Example III*

The filtered broth of Example I is extracted at pH 4 with a half volume of n-butanol. The extract is concentrated azeotropically to remove most of the solvent, thereafter, the concentrate is freeze dried and extracted with an equal volume of methanol. This extract is passed through a column of diethylaminoethyl cellulose and the column is washed with methanol.

In this manner, toyocamycin passes through the column while most of the dark colored impurities remain absorbed on the cellulose. The effluent fractions are concentrated to a small volume and toyocamycin precipitates as a solid crystalline product which is separated by filtration. Further purification of this product is achieved by recrystallization from a 1:1 mixture of methanol and chloroform.

*Example IV*

The filtered broth of Example II is stirred for 1 hour with 2.0% of activated carbon. The activated carbon is removed by filtration and is washed twice with 100 ml. of a mixture containing three parts of methanol and two parts of an equal mixture of water and pyridine. Thereafter, the combined extractions are concentrated under reduced pressure and passed through a column of activated magnesium silicate. This column is washed with 100 ml. of water and the toyocamycin eluated with 175 ml. of methanol. The effluent is concentrated under vacuum and the resulting precipitate recrystallized from an equal mixture of methanol and chloroform. In this manner, is obtained pure crystalline toyocamycin.

*Example V*

Forty-two Swiss white mice weighing from 18 to 22 grams were implanted with L-1210 by intraperitoneal injection employing the procedure described by Law, L. W., in the Journal of Natl. Cancer Inst., vol. 10, p. 179 (1949). Thereafter, the animals were divided into seven groups containing six animals in each group. Twenty-four hours after the implantation of L-1210, six of the animal groups were placed on toyocamycin therapy which was administered by intraperitoneal injection while the seventh group of animals was employed as a control. The details and results of this experiment are listed in Table II.

TABLE II

| Group | Dose, mg./kg. | Number of Treatments | Route of Administration | Change in Body Weight (gm.) | Mean Survival Time (days) |
|---|---|---|---|---|---|
| Control | | | | +0.9 | 9.0 |
| 1 | 0.025 | 1 injection/day. | intraperitoneal injection. | +0.9 | 9.8 |
| 2 | 0.500 | do | do | +0.6 | 10.2 |
| 3 | 0.100 | do | do | +0.2 | 10.2 |
| 5 | 0.150 | do | do | +0.6 | 10.7 |
| 5 | 0.200 | do | do | −1.0 | 10.7 |
| 6 | 0.250 | do | do | −1.2 | 10.5 |

The results in Table II demonstrated that all the animal groups receiving toyocamycin therapy had a longer survival time than the control group.

*Example VI*

The procedure employed in Example III was repeated, however, in this experiment the treated animals received toyocamycin therapy every other day. The results of this experiment are shown in Table III.

TABLE III

| Group | Dose, mg./kg. | Number of Treatments | Route of Administration | Change in Body Weight (gm.) | Mean Survival Time (days) |
|---|---|---|---|---|---|
| Control | | | | +0.9 | 9.0 |
| 1 | 0.1 | 1 injection/every other day. | Intraperitoneal injection. | +0.4 | 10.5 |
| 2 | 0.2 | do | do | +0.1 | 10.2 |
| 3 | 0.3 | do | do | −1.1 | 11.0 |
| 4 | 0.4 | do | do | −1.2 | 10.7 |
| 5 | 0.5 | do | do | −1.0 | 10.7 |

Table III shows that those animals receiving toyocamycin therapy survived longer than the controls.

What is claimed is:

1. A process for the preparation of the tumor inhibiting agent, toyocamycin, which comprises cultivating *Streptomyces rimosus* culture ATCC 14500 in an aqueous nutrient medium comprising a source of nitrogen, a source of carbohydrate and a source of minerals until substantial antibiotic inhibiting activity is imparted to the medium.

2. A process as described in claim 1 wherein after cultivation toyocamycin is purified by filtration of the broth, extraction of said filtrate with an alkanol at a pH of from about 4 to about 6, and concentration of said extract.

3. A process as described in claim 2 wherein toyocamycin is further purified by column chromatography on a weakly basic anion exchange resin in an alkanol solution.

4. A process as described in claim 3 wherein the toyocamycin eluate from said column is concentrated and further purified by recrystallization from a system comprising an alkanol and chloroform.

5. A process as described in claim 1 wherein toyocamycin is purified by filtration of said cultivated broth, treatment of said filtrate with activated carbon, extraction of said activated carbon with a mixture comprising pyridine and water, and concentration of said extract.

6. A process as described in claim 5 wherein toyocamycin in said concentrated extract is further purified by column chromatography on activated magnesium silicate in an alkanol solution.

7. A process as described in claim 6 wherein the toyocamycin eluate from said column is concentrated and further purified by recrystallization from a system comprising an alkanol and chloroform.

References Cited in the file of this patent

UNITED STATES PATENTS

| 2,516,080 | Sobin | July 18, 1950 |
| 2,871,166 | Goodman | Jan. 27, 1959 |